(12) United States Patent
Sul et al.

(10) Patent No.: US 12,142,924 B2
(45) Date of Patent: Nov. 12, 2024

(54) BIDIRECTIONAL DC/AC POWER CONVERSION SYSTEM HAVING MULTIPLE DC LINKS

(71) Applicant: SEOUL NATIONAL UNIVERSITY R&DB FOUNDATION, Seoul (KR)

(72) Inventors: Seung-Ki Sul, Seoul (KR); Sanggi Ko, Seoul (KR); Shenghui Cui, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 18/271,225

(22) PCT Filed: Nov. 15, 2021

(86) PCT No.: PCT/KR2021/016641
§ 371 (c)(1),
(2) Date: Jul. 6, 2023

(87) PCT Pub. No.: WO2023/013824
PCT Pub. Date: Feb. 9, 2023

(65) Prior Publication Data
US 2024/0088666 A1 Mar. 14, 2024

(30) Foreign Application Priority Data
Aug. 4, 2021 (KR) .......................... 10-2021-0102747

(51) Int. Cl.
*H02J 3/36* (2006.01)
*H02M 7/483* (2007.01)
(Continued)

(52) U.S. Cl.
CPC ............... *H02J 3/36* (2013.01); *H02M 7/483* (2013.01); *H02M 7/493* (2013.01); *H02M 7/797* (2013.01)

(58) Field of Classification Search
CPC .......... H02J 3/36; H02M 7/483; H02M 7/493; H02M 7/797; H02M 7/4835; H02M 7/5387
See application file for complete search history.

(56) References Cited

U.S. PATENT DOCUMENTS 10,840,813 B2 * 11/2020 Tanaka ................. H02M 5/4585
11,682,968 B2 * 6/2023 Yu ............................ H02M 1/38
323/271
(Continued)

FOREIGN PATENT DOCUMENTS

| CN | 110995030 B | 12/2020 |
| CN | 112910302 A | 6/2021 |

(Continued)

OTHER PUBLICATIONS

PCT International Search Report, PCT/KR2021/016641, Apr. 28, 2022, 4 Pages.

(Continued)

*Primary Examiner* — Jared Fureman
*Assistant Examiner* — Michael J Warmflash
(74) *Attorney, Agent, or Firm* — Fenwick & West LLP

(57) ABSTRACT

Embodiments of the present application relate to a bidirectional DC/AC power conversion system having multiple DC links, which comprises: a main DC link; at least one auxiliary DC link including at least one of a first auxiliary DC link having a positive terminal connected to a positive terminal of the main DC link and a second auxiliary DC link having a negative terminal connected to a negative terminal of the main DC link; and a plurality of cells connected in series to form one or more legs.

16 Claims, 6 Drawing Sheets

(51) Int. Cl.
*H02M 7/493* (2007.01)
*H02M 7/797* (2006.01)

(56) References Cited

U.S. PATENT DOCUMENTS

| | | | |
|---|---|---|---|
| 2016/0141963 A1 | 5/2016 | Bakran et al. | |
| 2020/0066731 A1* | 2/2020 | Iwaki | H10B 12/31 |
| 2020/0142330 A1* | 5/2020 | Chen | G06F 3/1222 |
| 2020/0274456 A1* | 8/2020 | Tanaka | H02M 5/4585 |
| 2020/0373851 A1* | 11/2020 | Wang | H02M 1/15 |
| 2021/0004589 A1* | 1/2021 | Turkelson | G06V 30/19173 |
| 2021/0057488 A1* | 2/2021 | Hwu | H10N 70/011 |

FOREIGN PATENT DOCUMENTS

| | | |
|---|---|---|
| JP | 2009-303401 A | 12/2009 |
| JP | 2014-166081 A | 9/2014 |
| JP | 2018-133950 A | 8/2018 |
| JP | 2019-140738 A | 8/2019 |
| JP | 6591064 B2 | 10/2019 |
| KR | 10-2016-0060829 A | 5/2016 |
| KR | 10-1668431 B1 | 10/2016 |
| KR | 10-2020-0142330 A | 12/2020 |
| KR | 10-2021-0004589 A | 1/2021 |
| KR | 10-2021-0057488 A | 5/2021 |

OTHER PUBLICATIONS

Jung, J.J., et al., "Control Strategy for Improved Dynamic Performance of Variable-speed Drives with Modular Multilevel Converter," IEEE Journal of Emerging and Selected Topics in Power Electronics, Jun. 2015, vol. 3, No. 2, pp. 371-380.

The Japan Patent Office, Office Action, Japanese Patent Application No. 2023-539292, Jul. 23, 2024, six pages.

European Patent Office, Extended European Search Report, European Patent Application No. 21952946.8, Sep. 25, 2024, 10 pages.

Xiao, Q. et al. "Modular Multilevel Converter Based Multi-Terminal Hybrid AC/DC Microgrid with Improved Energy Control Method." Applied Energy, vol. 282, Part A, Jan. 15, 2021, pp. 1-15.

* cited by examiner

[FIG. 1]
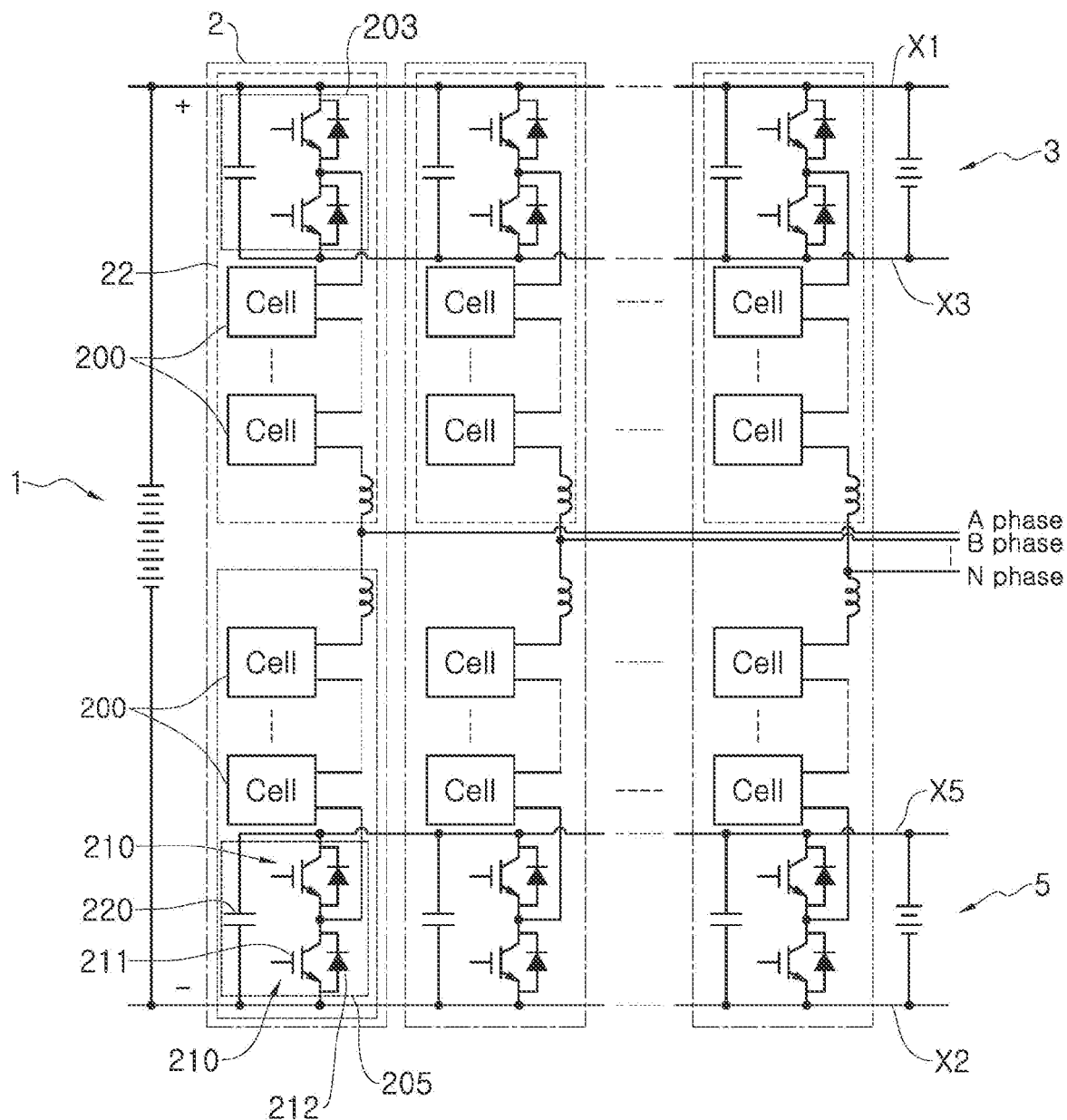

[FIG. 2]
203, 205
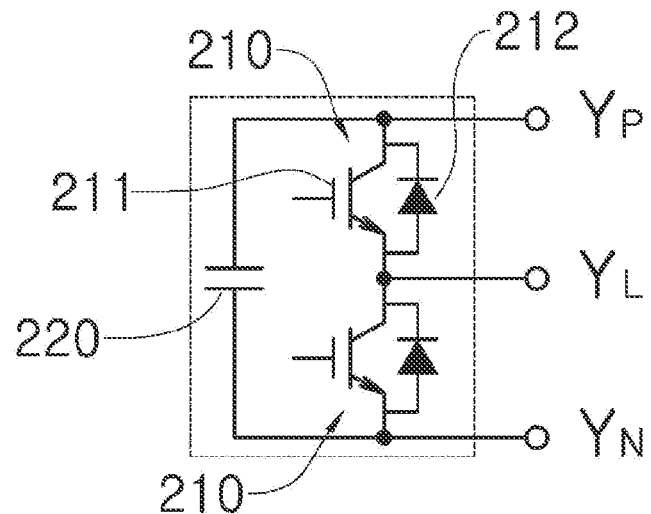
[FIG. 3A]
200
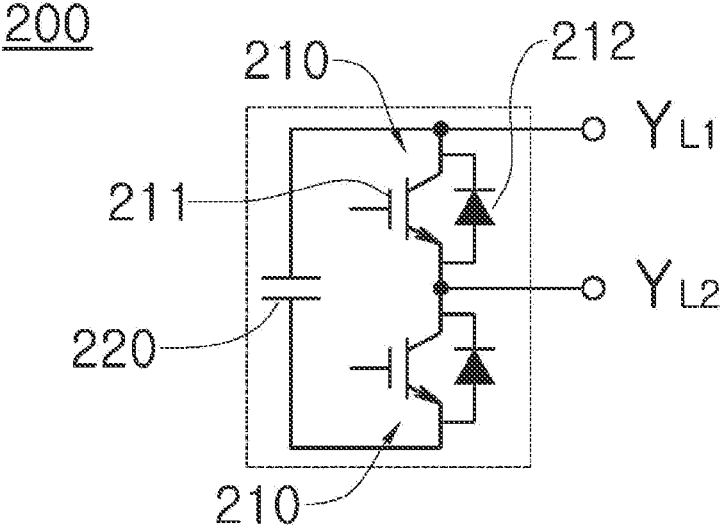

[FIG. 3B]
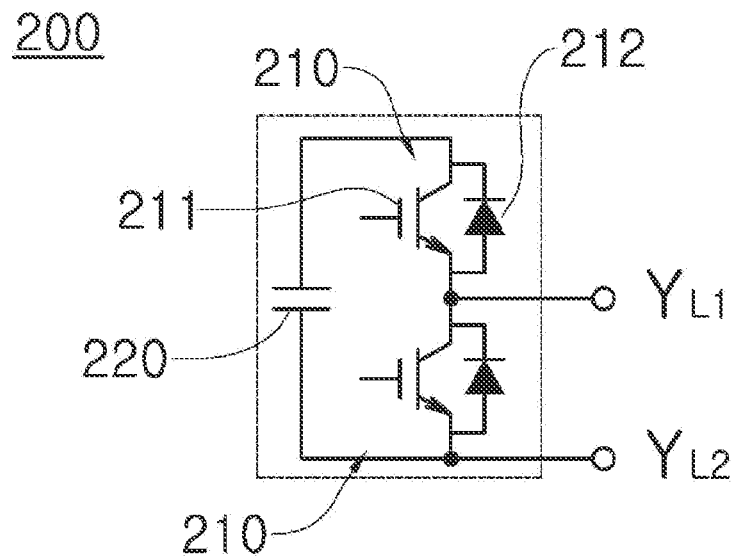
[FIG. 3C]
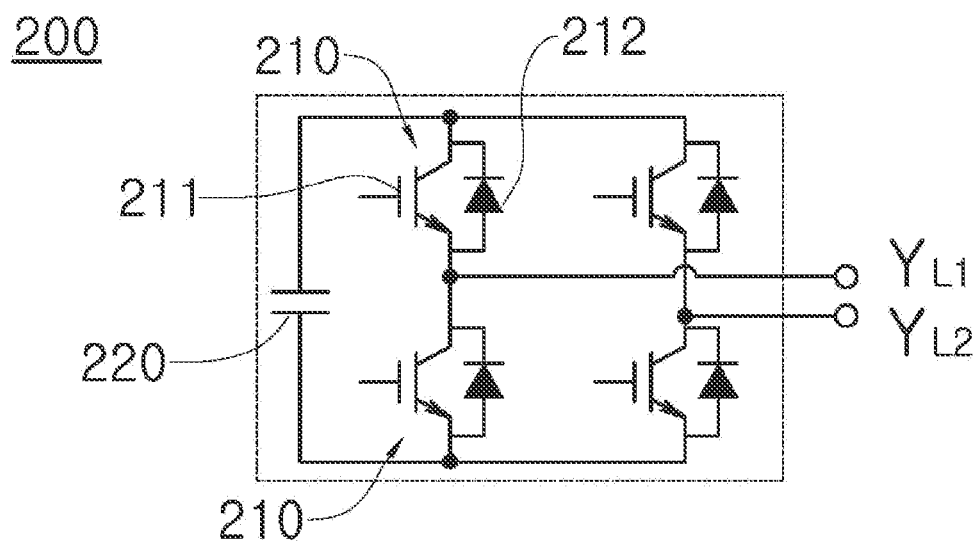

[FIG. 4]
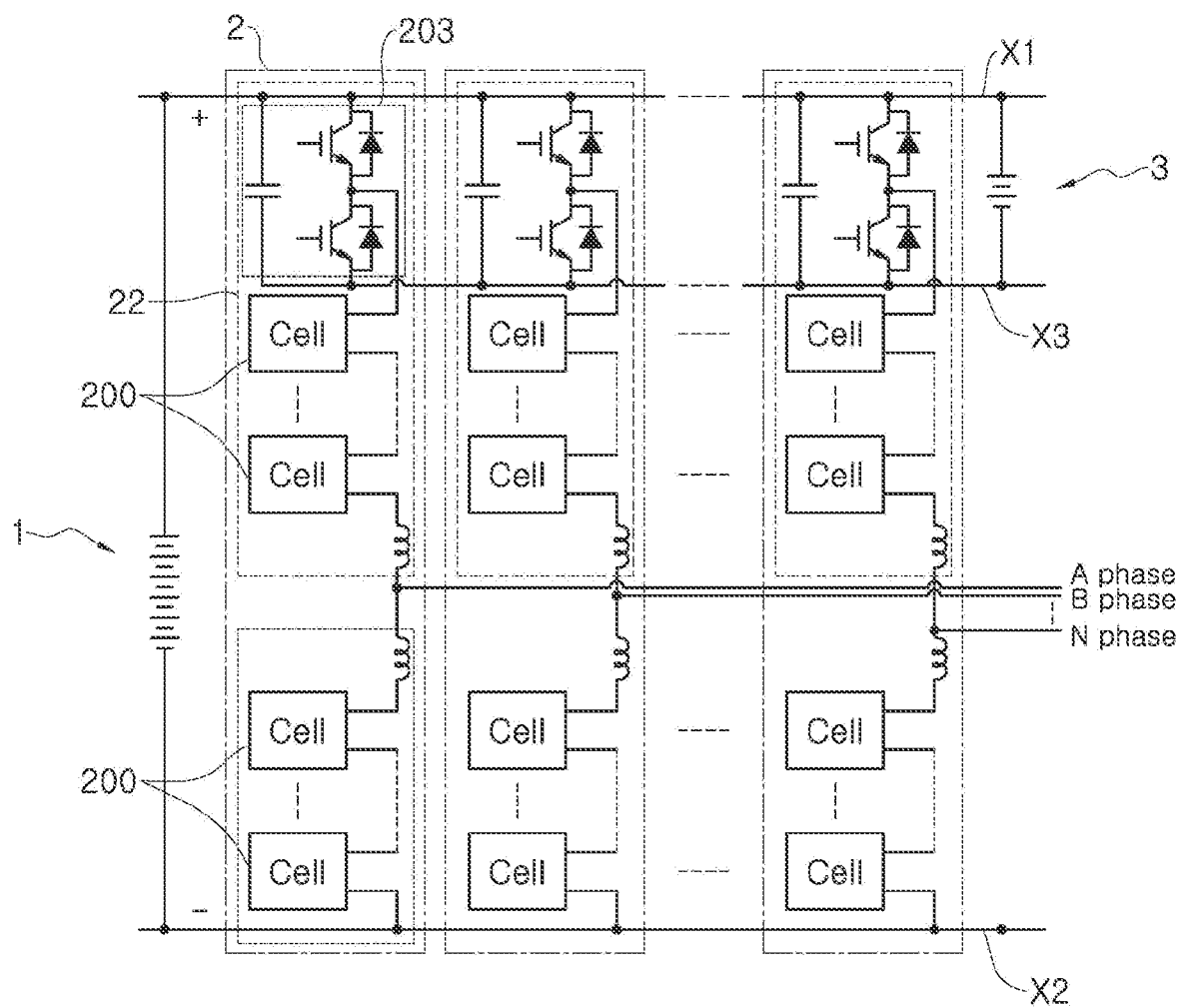

[FIG. 5]
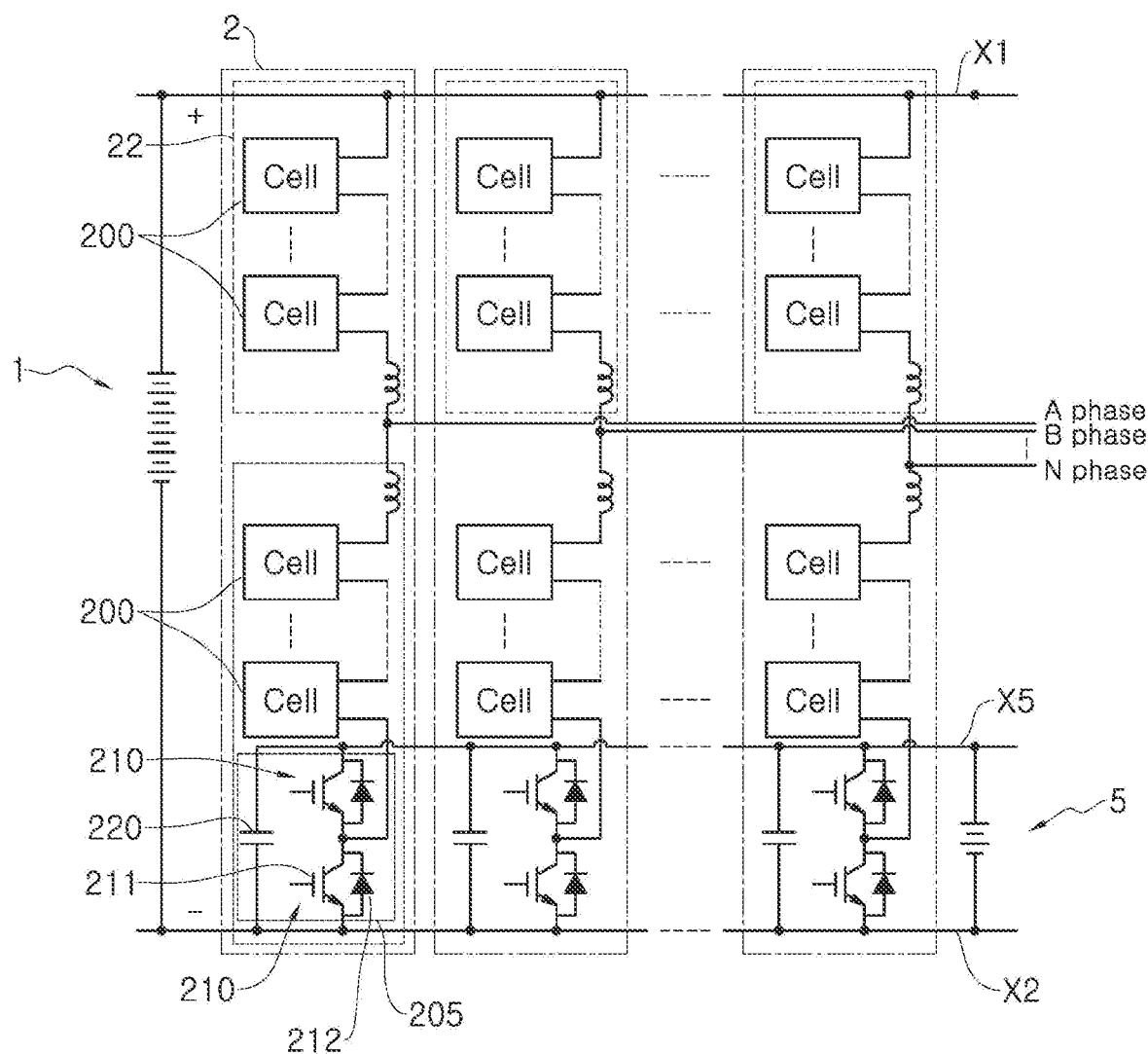

[FIG. 6]
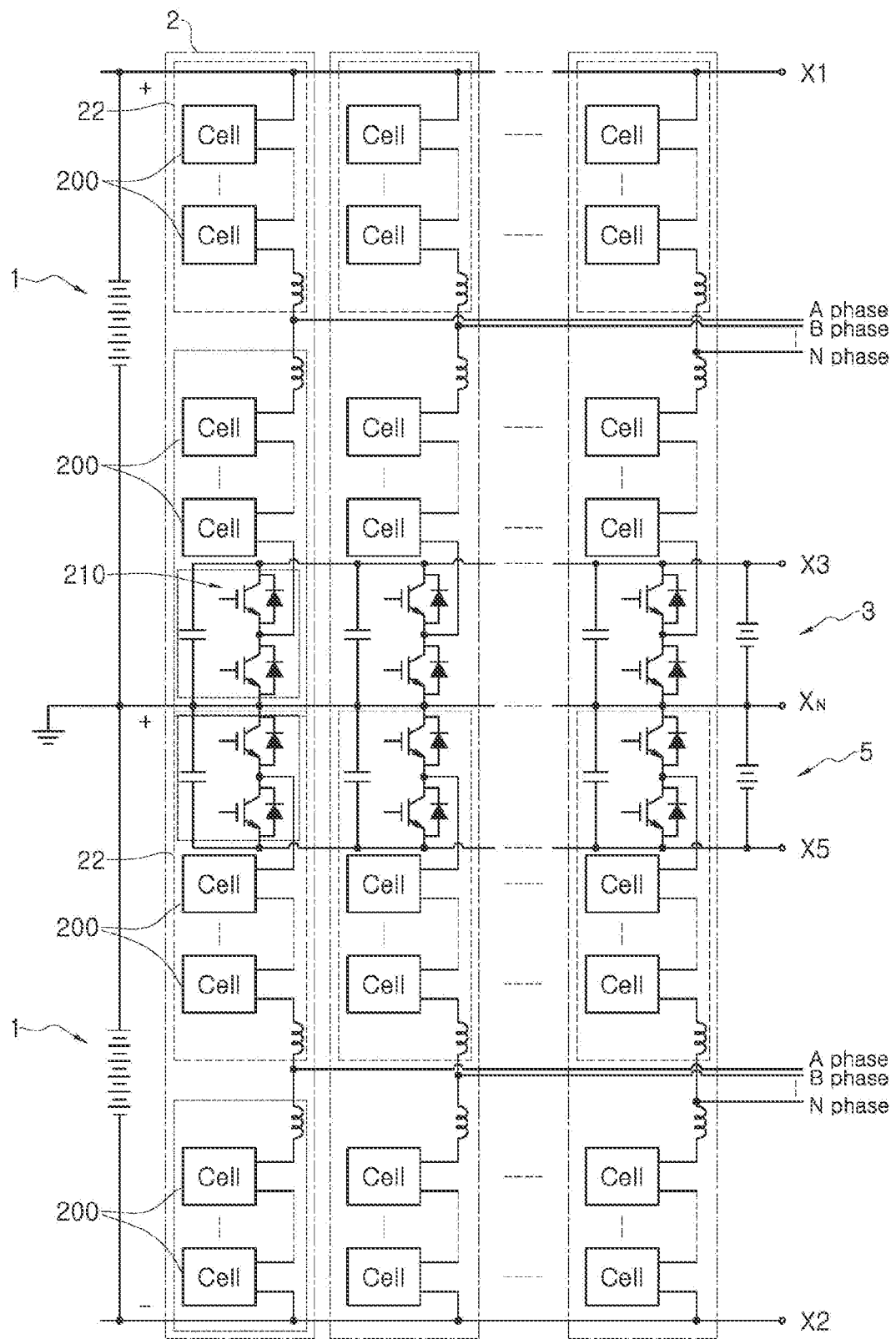

BIDIRECTIONAL DC/AC POWER CONVERSION SYSTEM HAVING MULTIPLE DC LINKS

TECHNICAL FIELD

The present application relates to a DC-AC power conversion system, and more particularly to a bidirectional DC/AC power conversion system having multiple DC links, which includes, in a bidirectional DC/AC power conversion circuit having a modular multi-level converter (MMC) structure, a first auxiliary DC link (Aux. DC link) consisting of cells connected to a positive electrode of a main DC link and/or a second auxiliary DC link consisting of cells connected to a negative electrode of the main DC link.

BACKGROUND ART

Conventional ships based on fossil fuels are provided with independent power systems that are configured to primarily use alternating current power of a specific frequency/voltage value.

Applying the power system of the conventional fossil fuel-based ship with fixed frequency/voltage values to an electric propulsion ship has a disadvantage of decreasing efficiency when an output power varies with an operating speed of the electric propulsion ship.

To overcome this disadvantage described above, a variable-speed engine power generation system based on a direct current distribution has been developed for the electric propulsion ship and applied to the power system of the electric propulsion ship. In the above variable-speed engine power generation system, DC-AC conversion is required to connect the output power of the variable-speed generator with the propulsion electric motor, and a low-voltage AC power source of a predetermined voltage is also required to supply power to hotel loads and other electrical loads of the electric propulsion ship.

In recent years, there has been a significant demand to equip ships with energy storage devices such as batteries to improve fuel efficiency and solve environmental issues such as reducing emissions. This battery connection requires a separate power converter within the electric power system for the electric propulsion ship. In particular, large-scale (several MW to tens of MW) power conversion is essential for large ships, as power consumption of the load is very high compared to other mobility applications such as electric vehicles.

In addition, ships require multiple voltages of DC/AC power to coexist, not only due to power demands of the propulsion loads, but also due to power demands of the hotel loads and other power loads. Therefore, a power conversion circuit that is capable of integrally linking coexisting DC/AC power is required.

DISCLOSURE

Technical Problem

According to embodiments of the present application, a bidirectional DC/AC power conversion system having multiple DC links is provided that is capable of converting large amounts of power and is capable of linking DC/AC power of multiple coexisting voltages.

Technical Solution

A bidirectional DC/AC power conversion system having multiple DC links according to one aspect of the present application, the bidirectional DC/AC power conversion system including: a main DC link having a positive terminal and a negative terminal; at least one auxiliary DC link—the at least one auxiliary DC link includes at least one of a first auxiliary DC link having a positive terminal connected to the positive terminal of the main DC link, and a second auxiliary DC link having a negative terminal connected to the negative terminal of the main DC link; a plurality of cells connected in series to form one or more legs—each cell includes a semiconductor-based switching element, and each of the one or more legs is connected in parallel to the main DC link; and one or more phase terminals formed between an arm including portions of the cells and an arm including other portions of the cells in each leg, and capable of outputting a phase current.

In an embodiment, the plurality of cells may include at least one first cell, at least one second cell, and a plurality of third cells. The first auxiliary DC link consists of the at least one first cell, and the second auxiliary DC link consists of the at least one second cell. The plurality of third cells are disposed between the first cell and the second cell in each leg.

In an embodiment, the bidirectional DC/AC power conversion system may be configured such that the first auxiliary DC link and the main DC link share a positive terminal, or the second auxiliary DC link and the main DC link share a negative terminal.

In an embodiment, the first cell may include three output terminals. One output terminal of the three output terminals may be connected in series to an adjacent third cell, and the other two output terminals of the three output terminals may be connected to a positive output terminal and a negative output terminal of the first auxiliary DC link, respectively. The second cell may include three output terminals. One output terminal of the three output terminals may be connected in series to an adjacent third cell, and the other two output terminals of the three output terminals may be connected to a positive output terminal and a negative output terminal of the second auxiliary DC link, respectively. In the first and second cells, the one output terminal in series with the adjacent third cell is positioned on the series connection of a switching element in each cell.

In an embodiment, the third cell may include two output terminals. the two output terminals are each connected to each one output terminal of two different adjacent third cells, or the two output terminals are each connected to one output terminal of different adjacent third cell and one output terminal of the first cell or the second cell.

In an embodiment, the third cell may have any circuit structure that is different from the first cell and the second cell.

In an embodiment, the phase terminal may be connected to an N-phase link including a power source or load. The bidirectional DC/AC power conversion system is configured to supply power to the N-phase link from each DC link of one or more of the main DC link, the first DC link, and the second DC link, or to supply power from the N-phase link to each DC link of one or more of the main DC link, the first DC link, and the second DC link.

In an embodiment, the bidirectional DC/AC power conversion system may be configured to allow power exchange between the main DC link and the N-phase link when all of the plurality of legs are connected to the N-phase link via respective phase terminals. The power supply between the main DC link and the N-phase link is carried out with an N-phase current of a value equal to the number of legs connected.

In an embodiment, the bidirectional DC/AC power conversion system may be configured such that power exchange between the main DC link and the N-phase link and power exchange between the at least one auxiliary DC link and the main DC link are possible when portions of the plurality of legs are connected to the N-phase link via respective phase terminals and other portions of the plurality of legs are connected to the at least one auxiliary DC link of the first auxiliary DC link and the second auxiliary DC link. An alternating current constant outputtable from the main DC link is a value that decreases in response to the number of the other portions of legs.

In an embodiment, the bidirectional DC/AC power conversion system may be configured such that some or all of the main DC link and at least one auxiliary DC link are each directly exchangeable for power with each other.

In an embodiment, in the bidirectional DC/AC power conversion system, the main DC link may be applied with a voltage greater than a voltage applied to each of the at least one auxiliary DC link.

In an embodiment, the bidirectional DC/AC power conversion system may be configured to be applied with a voltage greater than a total sum of a voltage applied to the first auxiliary DC link and a voltage applied to the second auxiliary DC link.

A bidirectional DC/AC power conversion system having multiple DC links according to another aspect of the present application, the bidirectional DC/AC power conversion system including: a plurality of main DC links having a positive terminal and a negative terminal—the plurality of main DC links form a neutral point; at least one auxiliary DC link—the at least one auxiliary DC link includes at least one of a first auxiliary DC link having a positive terminal connected to the positive terminal of the main DC link, and a second auxiliary DC link having a negative terminal connected to the negative terminal of the main DC link; a plurality of cells connected in series to form one or more legs—each cell includes a semiconductor-based switching element, and each of the one or more legs is connected in parallel to the corresponding main DC link; and one or more phase terminals formed between an arm including portions of the cells and an arm including other portions of the cells in each leg, and capable of outputting a phase current.

In an embodiment, the bidirectional DC/AC power conversion system may be configured such that the first auxiliary DC link and the two main DC links each have different positive terminal, the second auxiliary DC link and the two main DC links each have different negative terminal, and a negative terminal of the first auxiliary DC link and a positive terminal of the second auxiliary DC link are connected to a terminal of the neutral point.

In an embodiment, the negative terminal of the first auxiliary DC link and the positive terminal of the second auxiliary DC link may be the terminal of the neutral point.

In an embodiment, the two main DC links each may include phase terminals that correspond to the number of legs connected in parallel with the main DC link.

Advantageous Effects

With a DC/AC power conversion system of the present application, various DC voltage sources and electric propulsion motors may be easily connected without the need for a separate transformer and an additional power converter. In particular, multiple DC power sources with varying voltages may be connected to an AC output without the need for a separate power converter or transformer, and a bidirectional power exchange between DC power sources or between DC/AC is possible.

DESCRIPTION OF DRAWINGS

In order to more clearly describe the technical solutions of the present invention or embodiments of the related art, the drawings required in the description of the embodiments are briefly introduced below. It should be understood that the following drawings are for the purpose of describing embodiments of the present specification and are not intended to be limiting. In addition, for clarity of description, some elements may be illustrated in the drawings below with various variations, including exaggeration and omission.

FIG. 1 is a schematic view of a bidirectional DC/AC power conversion system with multiple DC links, according to specific embodiments of the present application.

FIG. 2 is a schematic view of a first type cell, according to an embodiment of the present application.

FIG. 3A, FIG. 3B, and FIG. 3C are schematic views of a second type cell, according to an embodiment of the present application.

FIGS. 4 and 5 are schematic views of the bidirectional DC/AC power conversion system with multiple DC links, according to other specific embodiments of the present application.

FIG. 6 is a schematic view of the bidirectional DC/AC power conversion system with multiple DC links, according to another specific embodiment of the present application.

DESCRIPTION OF REFERENCE NUMERALS

1: Main DC link
2: Leg
3 and 5: Auxiliary DC link
22: Arm
200, 203, and 205: Cell
1000: Bidirectional DC/AC power conversion system

MODE FOR DISCLOSURE

Hereinafter, embodiments of the present invention will be described in detail with reference to the drawings.

However, this is not intended to limit the present disclosure to any particular embodiment and is should be understood to include various modifications, equivalents, and/or alternatives to the embodiments of the present disclosure. In connection with the description of the drawings, the similar reference numerals may be used for the similar constituent elements.

In the present specification, expressions such as "has," "may have," "includes/comprises," or "may comprise/may include" refer to the presence of the corresponding features (e.g., a numerical value, a function, an operation, a step, and a constituent element such as a part, element, and/or component) and are not intended to exclude the presence or addition of additional features.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

The terms "first" and "second" used in various embodiments may be used regardless of the order and/or importance of various constituent elements and do not limit the corresponding constituent elements. The expressions described above are used to distinguish one constituent element from another constituent element. For example, a first constituent element and a second constituent element may represent different constituent elements, regardless of the order or importance.

A bidirectional DC/AC power conversion system (hereinafter referred to as a DC/AC power conversion system) according to embodiments of the present application includes a bidirectional DC/AC power conversion circuit having a modular multi-level converter (MMC) structure. The bidirectional DC/AC power conversion circuit having the MMC structure includes a plurality of DC links.

FIG. 1 is a schematic view of a bidirectional DC/AC power conversion system with multiple DC links, according to specific embodiments of the present application.

With reference to FIG. 1, the bidirectional DC/AC power conversion system having multiple DC links (hereinafter referred to as the DC/AC power conversion system 1000) includes a bidirectional DC/AC power conversion circuit having a modular multi-level converter (MMC) structure. The bidirectional DC/AC power conversion circuit having the MMC structure includes a main DC link 1; at least one auxiliary DC link; and a plurality of cells 200, 203, and 205. In specific embodiments, the DC/AC power conversion system 1000 includes a first auxiliary DC link 3 and a second auxiliary DC link 5.

The main DC link 1 has a positive terminal X1 and a negative terminal X2. The main DC link 1 is connected in parallel to a main power source providing main DC power. For example, the main DC link 1 may be a fuel cell output DC link. In a ship, power generated by an engine may also be used as power of the main DC link 1.

The auxiliary DC link 3 and 5 may be a link of a power system that is different from the main DC link 1, for example, a DC link that has rectified an alternator output, or a battery DC link.

Voltages of the auxiliary DC links 3 and 5 are each smaller than a voltage of the main DC link 1. The voltage of the main DC link 1 may be greater than a sum of the voltages of the auxiliary DC links 3 and 5. The voltage applied to the main DC link 1 may be, for example, several thousand volts. In contrast, the voltages applied to the auxiliary DC links 3 and 5 may be, for example, 1000 V or less.

Cells 200, 203, and 205 include a plurality of power semiconductors 210; and at least one energy storage unit 220. The power semiconductors 210 are connected in series with each other. The energy storage unit 220 may store DC power. The plurality of power semiconductors 210 are connected in parallel to the energy storage unit(s) 220 in the form of a bridge.

The power semiconductor 210 includes a turn-on/turn-off controllable power semiconductor switch 211 and a reflux diode 212 connected in parallel therewith. The power semiconductor 210 is controlled to turn on/off by a control signal from a control unit (not illustrated).

The cells 200, 203, and 205 may also have a half-bridge circuit, full-bridge circuit structure. With reference to FIGS. 2 and 3 below, the cell structure is described in more detail.

The power semiconductor 210 may be an insulated gate bipolar transistor (IGBT), a field effect transistor (FET), a transistor, a gate turn-off thyristor (GTO, IGCT), a diode, or a semiconductor-based switching element that switches a flow of current. The energy storage unit 220 may be a capacitor, a battery, a fuel cell, or the like.

The plurality of cells 200, 203, and 205 are constituent elements corresponding to submodules of a MMC converter. The plurality of cells 200, 203, and 205 form at least one leg 2. The plurality of cells 200, 203, and 205 are connected in series to each leg 2. Each leg 2 includes a cell 203 that is directly connected to a positive electrode of the auxiliary DC link 3, a cell 205 that is directly connected to a negative electrode of the auxiliary DC link 5, and cells 200 disposed therebetween 203 and 205. In an embodiment, in case that the auxiliary DC link 3 shares the positive electrode with the main DC link 1, the cell 203 may be directly connected to a positive electrode of the main DC link 1, as illustrated in FIG. 1. In case that the auxiliary DC link 5 shares a negative electrode with the main DC link 1, the cell 205 may be directly connected to a negative electrode of the main DC link 1, as illustrated in FIG. 1.

The entire power conversion circuit may include n legs 2. Each leg 2 is connected in common to the main DC link 1. One terminal of each leg 2 is connected to the positive electrode of the main DC link 1 and the other terminal is connected to the negative electrode of the main DC link 1.

Each leg 2 includes a phase terminal capable of carrying an alternating phase current. The phase terminal is formed between an arm 22 and an arm 22 within each leg 2.

In each leg 2, the cell(s) disposed from each phase terminal to the positive electrode of the main DC link, and the cell(s) disposed from each phase terminal to the negative electrode of the main DC link are each referred to as the arm 22. That is, each leg 2 forms a pair of arms 22. The pair of arms 22 are connected in series on the same leg 2.

As illustrated in FIG. 1, a phase terminal through which a phase current proceeds from each leg 2 is connected respectively. The DC/AC power conversion system 1000 may provide up to N phase current in case of including n legs 2.

The auxiliary DC link 3 is composed of the at least one cell 203.

In an embodiment, the positive electrode of the auxiliary DC link 3 may be connected to the positive electrode of the main DC link 1. Then, in each leg, the cell 203 closest to the positive electrode of the main DC link is directly connected to the positive electrode of the main DC link 1 among the cells in the leg.

As illustrated in FIG. 1, the auxiliary DC link 3 may be formed to share the positive terminal X1 as well as the main DC link 1. The auxiliary DC link 3 has a negative terminal X3 connected to the other end of the cell 203 which has one end connected to the negative electrode of the main DC link 1.

The auxiliary DC link 5 is composed of the at least one cell 205.

In an embodiment, the negative electrode of the auxiliary DC link 5 closest to the negative electrode of the main DC link in each leg may be connected to the negative electrode of the main DC link 1. Then, the cell 205 is directly connected to the negative electrode of the main DC link 1 among the cells in the leg.

As illustrated in FIG. 1, the auxiliary DC link 5 may be formed to share the negative terminal X2 as well as the main DC link 1. The auxiliary DC link 5 has a positive terminal X5 connected to the other end of the cell 203 which has one end connected to the negative electrode of the main DC link 1.

In the plurality of cells 200, 203, and 205, the cells 203 and 205 that are directly connected to the auxiliary DC links 3 and 5 and the cells 200 therebetween may have different structures. The cells 203 and 205 directly connected to the auxiliary DC links 3 and 5 are cells of a first type structure (hereinafter referred to as "a first type cell"), and the cells 200 therebetween may be cells of a second type structure (hereinafter referred to as "a second type cell"). The cells 203 and 205 directly connected to the auxiliary DC links 3 and 5 include a different circuit from the cells 200 therebetween.

FIG. 2 is a schematic view of a first type cell, according to an embodiment of the present application.

With reference to FIG. 2, the cell 203 directly connected to the positive electrode of the main DC link 1; and the cell 205 directly connected to the negative electrode of the main DC link 1 include three output terminals $Y_L$, $Y_P$, and $Y_N$. One terminal $Y_L$ of the three output terminals is connected in series with another cell 200. As illustrated in FIGS. 1 and 2, the terminal $Y_L$ may be positioned on a series connection of the power semiconductor 210. The cells 203 and 205 are connected to the cell 200 via terminal $Y_L$ to form leg 2.

The other two terminals $Y_P$ and $Y_N$ of the three terminals are the terminals that are connected to the positive/negative electrodes of the corresponding auxiliary DC links 3 and 5. For example, the terminal $Y_P$ of the cell 203 is connected to the positive terminal $X_1$ of the auxiliary DC link 3. The terminal $Y_N$ of the cell 203 is connected to the negative terminal $X_3$ of the auxiliary DC link 3. The terminal $Y_P$ of the cell 205 is connected to the positive terminal $X_5$ of the auxiliary DC link 5. The terminal $Y_N$ of the cell 205 is connected to the negative terminal $X_2$ of the auxiliary DC link 5.

FIG. 3A, FIG. 3B, and FIG. 3C are schematic views of a second type cell, according to an embodiment of the present application.

With reference to FIG. 3A, FIG. 3B, and FIG. 3*c*, the cell 200 between the cells 203 and 205 includes two output terminals $Y_{L1}$ and $Y_{L2}$. Each of the two terminals $Y_{L1}$ and $Y_{L2}$ is connected to terminals $Y_{L1}$ and $Y_{L2}$ of another cell 200, respectively, or to a terminal $Y_L$ of cells 203 and 205; and to the terminal $Y_{L1}$ or $Y_{L2}$ of another cell 200. In an embodiment, the cell 200 may have a different circuit structure from circuits of the cells 203 and 205 in FIG. 2. In particular, the cell 200 may be implemented as a circuit of any structure other than the structure in FIG. 2. For example, the cell 200 in FIGS. 3A to 3C may have various switching circuit structures that connect DC and AC, in addition to a half-bridge circuit or a full-bridge circuit. After all, the cell 200 has a high degree of freedom of circuit configuration.

Each DC link 1, 3, and 5 may be connected to an AC load or an AC power source of a variable voltage/a variable frequency, or to an AC load or an AC power source of a commercial frequency of a specific voltage/a specific frequency, via a DC/AC power conversion unit (not illustrated). The DC/AC power conversion unit is a conventional DC/AC power conversion circuit and may include, for example, an inverter, a static frequency converter (SFC), or an AC transformer. The DC/AC power conversion unit converts high-voltage power into low-voltage power corresponding to the connected component (load or power source).

The main DC link 1 may also supply power to loads with relatively high power consumption, for example, ship propulsion loads such as a thruster motor or a propulsion motor.

In addition, the auxiliary DC links 3 and 5 may supply power to AC loads that are different from the propulsion loads, such as a hotel load. The auxiliary DC links 3 and 5 may be connected in parallel with an inverter, a static frequency converter (SFC), or an AC transformer to provide rated power to AC loads. When a DC power source (a battery, a fuel cell, a rectified output of an alternator, a DC link of an AC power source via an inverter) is connected to these separate auxiliary DC links 3, 5, the circuit in FIG. 1 is implemented as a circuit capable of additional power conversion.

The DC/AC power conversion system 1000 may also output an alternating current from a portion (e.g., a phase terminal) to which the upper/lower arms 22 of each leg 2 are connected.

Some or all of the n legs may also be connected to an N-phase AC link via the phase terminal. A value of N in N-phase may be equal to or less than the number of legs 2 (i.e., a value of n).

As described above, the DC/AC power conversion system 1000 may output up to N-phase alternating current in case of including N legs 2. The N-phase alternating current is supplied to the connected AC link (not illustrated). The N-phase AC link may also be a propulsion load, which may include an N-phase alternating current propulsion motor. An N-phase alternating current output is connected to the N-phase alternating current propulsion motor, which is used to propel a ship.

In addition, in FIG. 1, the N-phase alternating current output of the DC/AC power conversion system 1000 is power exchangeable with one or more DC links of the main DC link 1 and the auxiliary DC links 3 and 5, respectively. Power may be supplied to the N-phase link from each of the one or more DC links (e.g., 1, 3, or 5) of the plurality of DC links, or power may be supplied from the N-phase link to each of the one or more DC links (e.g., 1, 3, or 5) of the plurality of DC links.

In an embodiment, the main DC link 1 may be connected to the N-phase link (not illustrated) including an N-phase load supplied with the N-phase alternating current output. When all of the plurality of legs are connected to the N-phase link through each of the phase terminals, power exchange between the main DC link and the N-phase link is possible. This power exchange includes a power supply from the main DC link 1 to the N-phase link or a power supply from the N-phase link to the main DC link 1.

In an embodiment, the DC/AC power conversion system 1000 may be configured such that some of the n legs 2 are used for the purpose of exchanging power with the auxiliary DC links 3 and 5 so that no alternating current output is supplied to the N-phase link. It is possible to exchange power between the main DC link and the N-phase link, and to exchange power between the at least one auxiliary DC link and the main DC link.

In this case, an alternating current constant that is outputtable from the main DC link 1 is reduced in response to the number of some other legs compared to a case in which all legs 2 are connected. For example, the alternating current constant is reduced by the proportion of an output from some other legs 2 that is not connected.

In addition, each DC link 1, 3, or 5 may exchange power directly with each other without the intervention of the N-phase link. Even though the main DC link 1 is not connected, the auxiliary DC links 3 and 5 may exchange power with each other. Only one of the auxiliary DC links 3 and 5 may supply power to the N-phase link, or all of the auxiliary DC links 3 and 5 also may supply power to the N-phase link.

A voltage on each of the current links 1, 3, and 5 may be controlled independently of each other.

As described above, the DC/AC power conversion system 1000 is not limited to having a plurality of auxiliary DC links. In other specific embodiments, the DC/AC power conversion system 1000 may be modified to include the main DC link 1 and the single auxiliary DC link 3 or 5.

FIGS. 4 and 5 are schematic views of the bidirectional DC/AC power conversion system with multiple DC links, according to other specific embodiments of the present application.

The DC/AC power conversion system 1000 may include the main DC link 1; and the auxiliary DC link 3 including the cell 203 connected to the positive terminal X1 of the main DC link 1, as illustrated in FIG. 4.

Alternatively, the DC/AC power conversion system 1000 may include the main DC link 1; and the auxiliary DC link 5 including the cell 205 connected to the negative terminal $X_2$ of the main DC link 1, as illustrated in FIG. 5.

FIG. 6 is a schematic view of the bidirectional DC/AC power conversion system with multiple DC links, according to another specific embodiment of the present application.

With reference to FIG. 6, the DC/AC power conversion system 1000 may include two main DC links 1 and the two auxiliary DC links 3 and 5. The system 1000 in FIG. 6 may also be implemented as a combination of the systems 1000 in FIGS. 4 and 5. In FIG. 6, the main DC link 1 is configured as a bipolar DC link with a positive electrode, a neutral point $X_N$, and a negative electrode. The two DC links 1 form the neutral point $X_N$ with respective positive and negative terminals.

In the system 1000 in FIG. 6, the first auxiliary DC link 3 and the main DC link 1 do not share a positive terminal and each have different positive terminals X1 and $X_3$. The second auxiliary DC link 5 and the main DC link 1 do not share a negative terminal and each have different negative terminals $X_2$ and $X_5$.

The negative terminal of the first auxiliary DC link 3 and the positive terminal of the second auxiliary DC link are connected to a terminal of the neutral point $X_N$ and have the same potential.

In an embodiment, the negative terminal of the first auxiliary DC link 3 and the positive terminal of the second auxiliary DC link 5 may be the terminal of the neutral point $X_N$.

As illustrated in FIG. 6, the two main DC links 1 and the two auxiliary DC links 3 and 5 may be configured such that the terminal $X_N$ shared by the two main distribution ends 1 functions as the negative terminal of the first auxiliary DC link 3, the positive terminal of the second auxiliary DC link 5, and the neutral point of the system 1000, respectively.

In this case, the system 1000 in FIG. 6 may have twice the power conversion capacity for the same dielectric strength compared to the system 1000 in FIGS. 1, 4, and 5.

As described above, the DC/AC power conversion system 1000 is configured to mutually convert several MW to tens of MW of DC or AC power by multiple DC links, and to connect multiple DC power sources simultaneously. The DC/AC power conversion system 1000 may include the cells 200 including various circuits, thereby enabling a flexible system design in response to various voltages and powers. Particularly in an independent power system such as a ship, depending on various voltages of DC/AC power and the size of a ship, the power connection is useful for various capacities.

Furthermore, by including at least one auxiliary DC link 3 and 5 in addition to the main DC link 1, supply interruption problems such as load shedding can be minimized even though the main DC link 1 or the auxiliary DC links 3 and 5 are unable to supply power.

The present invention has been described above with reference to the embodiments illustrated in the drawings, which are just for illustration, and those skilled in the art will understand that various modifications and variations of the embodiments are possible. However, such modifications should be considered to be within the technical protection scope of the present invention. Accordingly, the true technical protection scope of the present disclosure should be determined by the technical spirit of the appended claims.

INDUSTRIAL APPLICABILITY

In accordance with embodiments of the present application, a bidirectional DC/AC power conversion system capable of connecting multiple DC power sources with varying voltages to an AC output and enabling bidirectional power exchange between DC power sources or between DC/AC, without a separate power converter or transformer, may be used in system industries where various DC and AC voltages are required to be connected. In particular, it is expected to have a high industrial applicability in the power conversion system industry for electric propulsion ships.

The invention claimed is:

1. In a bidirectional direct current (DC)/alternating current (AC) power conversion system having multiple DC links, the bidirectional DC/AC power conversion system comprising:
    a main DC link having a positive terminal and a negative terminal;
    at least one auxiliary DC link, wherein the at least one auxiliary DC link comprises at least one of a first auxiliary DC link having a positive terminal connected to the positive terminal of the main DC link, and a second auxiliary DC link having a negative terminal connected to the negative terminal of the main DC link;
    a plurality of cells connected in series to form one or more legs, wherein each of the plurality of cells comprises a semiconductor-based switching element, and each of the one or more legs is connected in parallel to the main DC link; and
    one or more phase terminals formed between an arm including portions of the plurality of cells and an arm including other portions of the plurality of cells in each of the one or more legs, and configured to output a phase current.

2. The bidirectional DC/AC power conversion system of claim 1, wherein the plurality of cells comprises at least one first cell, at least one second cell, and a plurality of third cells, and
    wherein the first auxiliary DC link consists of the at least one first cell, the second auxiliary DC link consists of the at least one second cell, and the plurality of third cells are disposed between the first cell and the second cell in each of the one or more legs.

3. The bidirectional DC/AC power conversion system of claim 2, wherein the first auxiliary DC link and the main DC link are configured to share a positive terminal, or the second auxiliary DC link and the main DC link are configured to share a negative terminal.

4. The bidirectional DC/AC power conversion system of claim 2, wherein the first cell comprises three output terminals, one output terminal of the three output terminals is connected in series with an adjacent third cell from the plurality of third cells, and a remaining two output terminals of the three output terminals are connected to a positive output terminal and a negative output terminal of the first auxiliary DC link, respectively,
  wherein the second cell comprises three output terminals, one output terminal of the three output terminals is connected in series with the adjacent third cell, and a remaining two output terminals of the three output terminals are connected to a positive output terminal and a negative output terminal of the second auxiliary DC link, respectively, and
  wherein the one output terminal connected in series with the adjacent third cell in each of the first and second cells is positioned on a series connection of a switching element in each of the plurality of cells.

5. The bidirectional DC/AC power conversion system of claim 2, wherein the third cell comprises two output terminals, and the two output terminals are each connected to each one output terminal of two different adjacent third cells, or the two output terminals are each connected to one output terminal of different adjacent third cell and one output terminal of the first cell or the second cell.

6. The bidirectional DC/AC power conversion system of claim 5, wherein the third cell has a circuit structure that is different from the first cell and the second cell.

7. The bidirectional DC/AC power conversion system of claim 1, wherein the one or more phase terminals is connected to an N-phase link, including a power source or load, and is configured to supply power to the N-phase link from each DC link of one or more of the main DC link, the first DC link, and the second DC link, or to supply power from the N-phase link to each DC link of one or more of the main DC link, the first DC link, and the second DC link.

8. The bidirectional DC/AC power conversion system of claim 7, wherein power exchange occurs between the main DC link and the N-phase link responsive to all of the plurality of legs are connected to the N-phase link via respective phase terminals, and
  wherein power supply between the main DC link and the N-phase link is carried out with an N-phase current of a value equal to a number of legs connected.

9. The bidirectional DC/AC power conversion system of claim 7, wherein power exchange occurs between the main DC link and the N-phase link and power exchange occurs between the at least one auxiliary DC link and the main DC link responsive to portions of the plurality of legs being connected to the N-phase link via respective phase terminals and other portions of the plurality of legs being connected to the at least one auxiliary DC link of the first auxiliary DC link and the second auxiliary DC link, and
  wherein an alternating current constant outputtable from the main DC link decreases in response to a number of other portions of legs.

10. The bidirectional DC/AC power conversion system of claim 1, wherein some or all of the main DC link and at least one auxiliary DC link are each directly exchangeable for power with each other.

11. The bidirectional DC/AC power conversion system of claim 1, wherein the main DC link is applied with a voltage greater than a voltage applied to each of the at least one auxiliary DC links.

12. The bidirectional DC/AC power conversion system of claim 11, wherein the bidirectional DC/AC power conversion system is applied with a voltage greater than a total sum of a voltage applied to the first auxiliary DC link and a voltage applied to the second auxiliary DC link.

13. In a bidirectional direct current (DC/)/alternating current (AC) power conversion system having multiple DC links, the bidirectional DC/AC power conversion system comprising:
  a plurality of main DC links having a positive terminal and a negative terminal, wherein the plurality of main DC links form a neutral point;
  at least one auxiliary DC link, wherein the at least one auxiliary DC link comprises at least one of a first auxiliary DC link having a positive terminal connected to the positive terminal of the main DC link, and
  a second auxiliary DC link having a negative terminal connected to the negative terminal of the main DC link;
  a plurality of cells connected in series to form one or more legs, wherein each of the plurality of cells comprises a semiconductor-based switching element, and each of the one or more legs is connected in parallel to the corresponding main DC link; and
  one or more phase terminals formed between an arm including portions of the plurality of cells and an arm including other portions of the plurality of cells in each of the one or more leg, and configured to output a phase current.

14. The bidirectional DC/AC power conversion system of claim 13, wherein the first auxiliary DC link and the two main DC links are configured to each have a different positive terminal,
  wherein the second auxiliary DC link and the two main DC links are configured to each have a different negative terminal, and
  wherein a negative terminal of the first auxiliary DC link and a positive terminal of the second auxiliary DC link are configured to be connected to a terminal of the neutral point.

15. The bidirectional DC/AC power conversion system of claim 14, wherein the negative terminal of the first auxiliary DC link and the positive terminal of the second auxiliary DC link are the terminal of the neutral point.

16. The bidirectional DC/AC power conversion system of claim 14, wherein the two main DC links each comprises phase terminals that correspond to a number of legs connected in parallel with the main DC link.

* * * * *